United States Patent
Lee

(10) Patent No.: US 8,328,216 B2
(45) Date of Patent: Dec. 11, 2012

(54) RETRACTABLE/EXTENDABLE CRANK USING A CYLINDRICAL CAM, AN END CAM, OR A SWASH PLATE CAM, AND BICYCLE USING THE SAME

(76) Inventor: Keun Hyoung Lee, Chungcheongnam-Do (KR)

( * ) Notice: Subject to any disclaimer, the term of this patent is extended or adjusted under 35 U.S.C. 154(b) by 22 days.

(21) Appl. No.: 13/054,792

(22) PCT Filed: Jul. 2, 2009

(86) PCT No.: PCT/KR2009/003629
§ 371 (c)(1),
(2), (4) Date: Jan. 18, 2011

(87) PCT Pub. No.: WO2010/008149
PCT Pub. Date: Jan. 21, 2010

(65) Prior Publication Data
US 2011/0121536 A1    May 26, 2011

(30) Foreign Application Priority Data

Jul. 18, 2008 (KR) .................. 10-2008-0070058
Dec. 2, 2008 (KR) .................. 10-2008-0121047
Jun. 24, 2009 (KR) .................. 10-2009-0056557

(51) Int. Cl.
*B62M 1/02* (2006.01)
*B62M 3/00* (2006.01)
(52) U.S. Cl. ............... 280/259; 74/594.2; 74/594.3
(58) Field of Classification Search ............. 74/594.1, 74/594.2, 594.3; 280/247, 248, 249, 250, 280/256, 257, 259, 260, 261
See application file for complete search history.

(56) References Cited

U.S. PATENT DOCUMENTS

| 4,560,182 | A  * | 12/1985 | Yamaguchi | 280/257 |
| 4,960,013 | A  * | 10/1990 | Sander | 74/594.3 |
| 5,566,590 | A  * | 10/1996 | Wan | 74/594.3 |
| 6,152,471 | A  * | 11/2000 | Kang et al. | 280/261 |
| 6,253,639 | B1 * | 7/2001 | Richardson | 74/594.3 |
| 6,341,946 | B1 * | 1/2002 | Kelley | 417/218 |
| 6,487,933 | B2 * | 12/2002 | Orioli et al. | 74/594.3 |
| 6,640,662 | B1 * | 11/2003 | Baxter | 74/594.3 |
| 7,093,516 | B2 * | 8/2006 | Hung | 74/594.3 |

(Continued)

FOREIGN PATENT DOCUMENTS
JP         50-097148        1/1949
(Continued)

OTHER PUBLICATIONS

International Search Report for PCT/KR2009/003629 mailed on Feb. 25, 2010.

*Primary Examiner* — Lesley D Morris
*Assistant Examiner* — Marc Scharich
(74) *Attorney, Agent, or Firm* — Christopher Paul Mitchell

(57) ABSTRACT

The present invention relates to a mechanical element, and more particularly, to a crank connected to a bicycle pedal or a handle for rotating a rotary body and to a bicycle using the same. The present invention uses a cylindrical cam, an end cam, or a swash plate cam, and the shafts of these cams and a shaft of a pedal or a handle for applying force are equipped with a miter gear (a bevel gear the number of teeth of which is 1:1 and the shaft angle of which is 90 degrees), such that the crank retracts/extends one time per one rotation of the pedal or the handle.

8 Claims, 7 Drawing Sheets

U.S. PATENT DOCUMENTS

| | | | |
|---|---|---|---|
| 7,350,796 B2 * | 4/2008 | Misevski | 280/259 |
| 2007/0137427 A1 * | 6/2007 | Stallard | 74/594.3 |

FOREIGN PATENT DOCUMENTS

| | | |
|---|---|---|
| JP | 63-148594 | 9/1988 |
| JP | 2001-294188 | 10/2001 |
| JP | 06-227473 | 8/2006 |
| KR | 10-0245960 | 12/1999 |
| KR | 20-0219860 | 1/2001 |
| WO | 96-00679 | 1/1996 |

* cited by examiner

[Fig. 1]
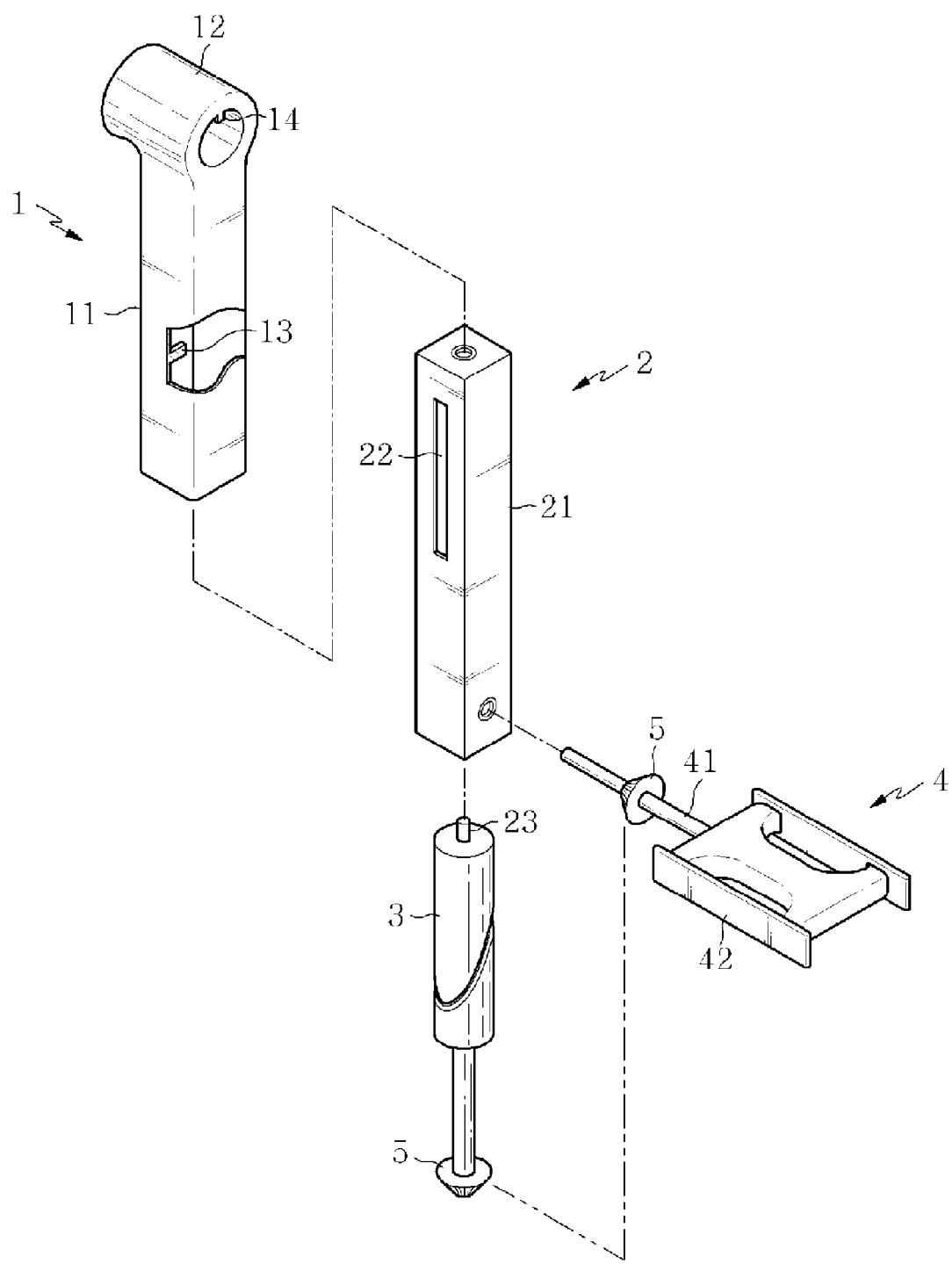

[Fig. 2]
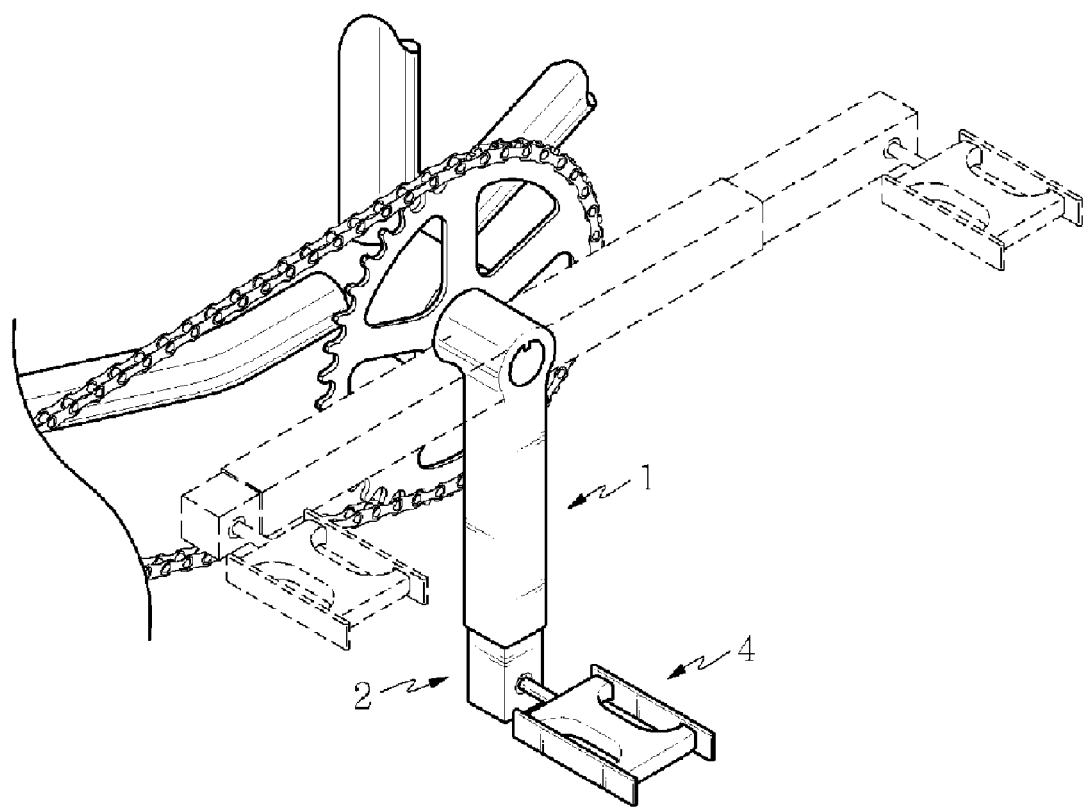

[Fig. 3]
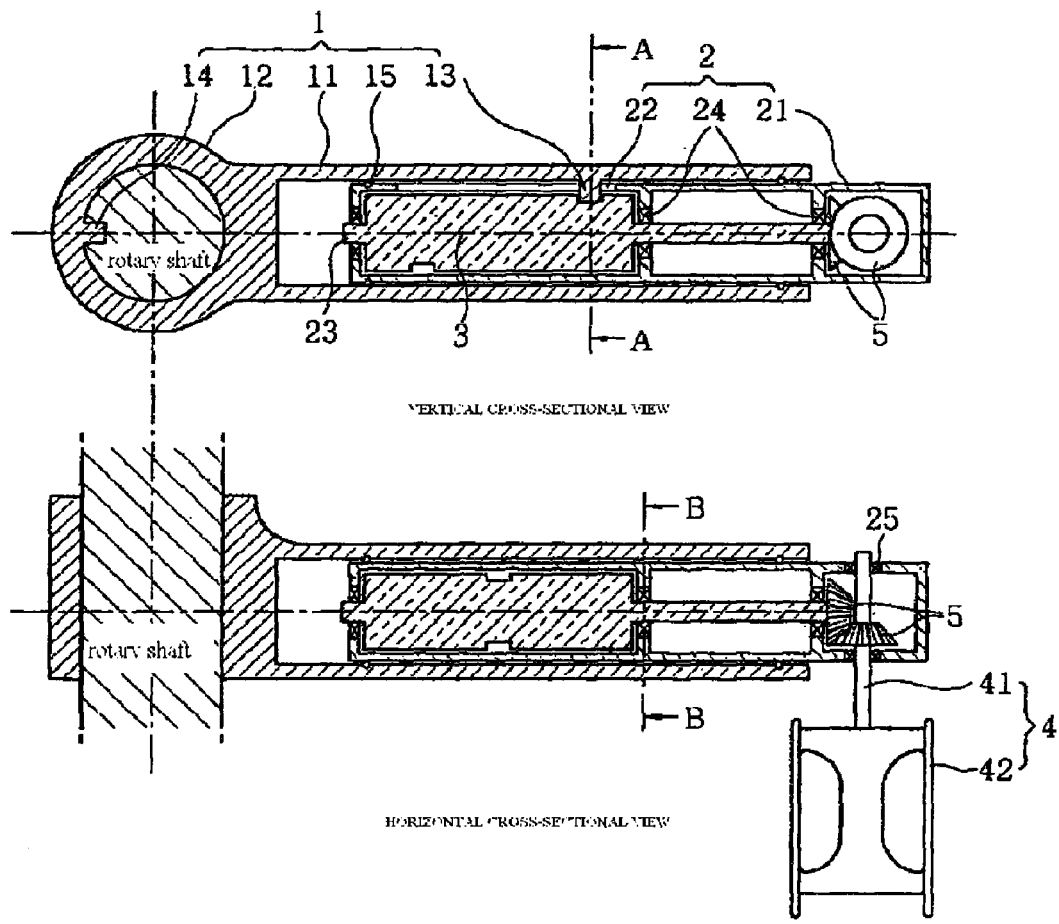
VERTICAL CROSS-SECTIONAL VIEW
HORIZONTAL CROSS-SECTIONAL VIEW
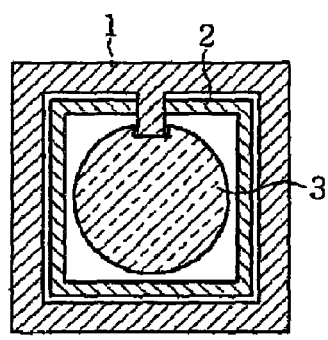
CROSS-SECTION A-A
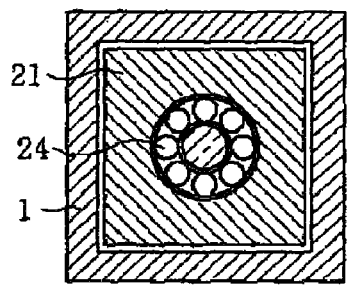
CROSS-SECTION B-B

[Fig. 4]
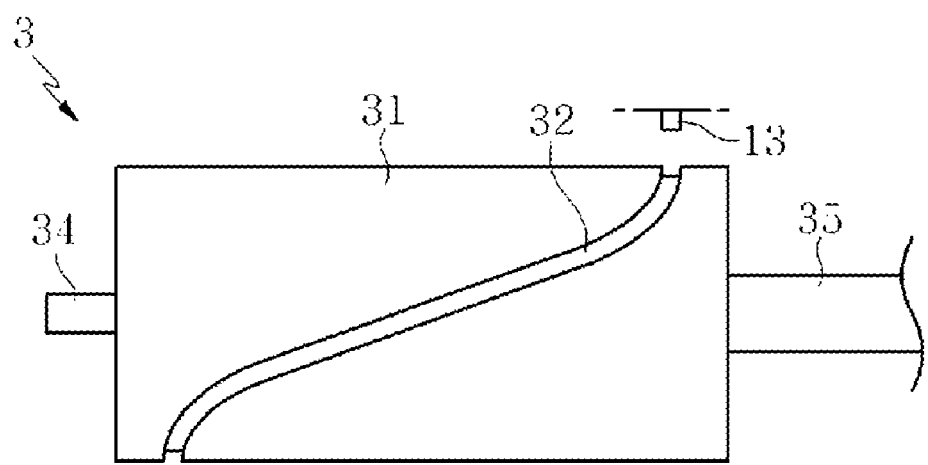
(a)
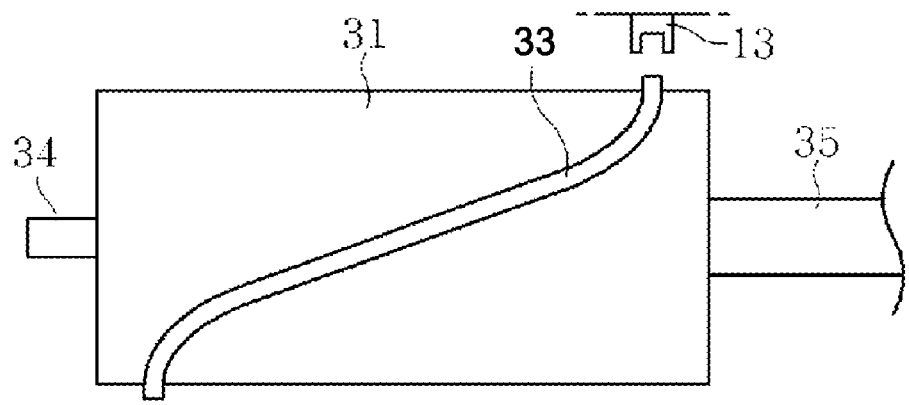
(b)

[Fig. 5]
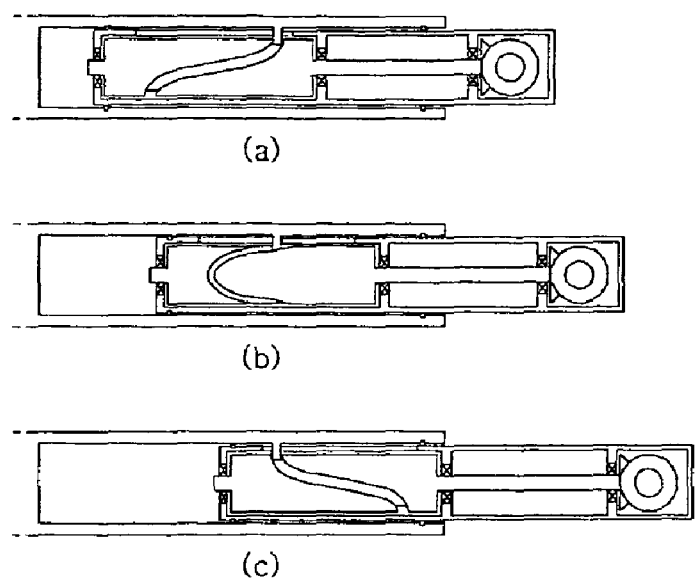
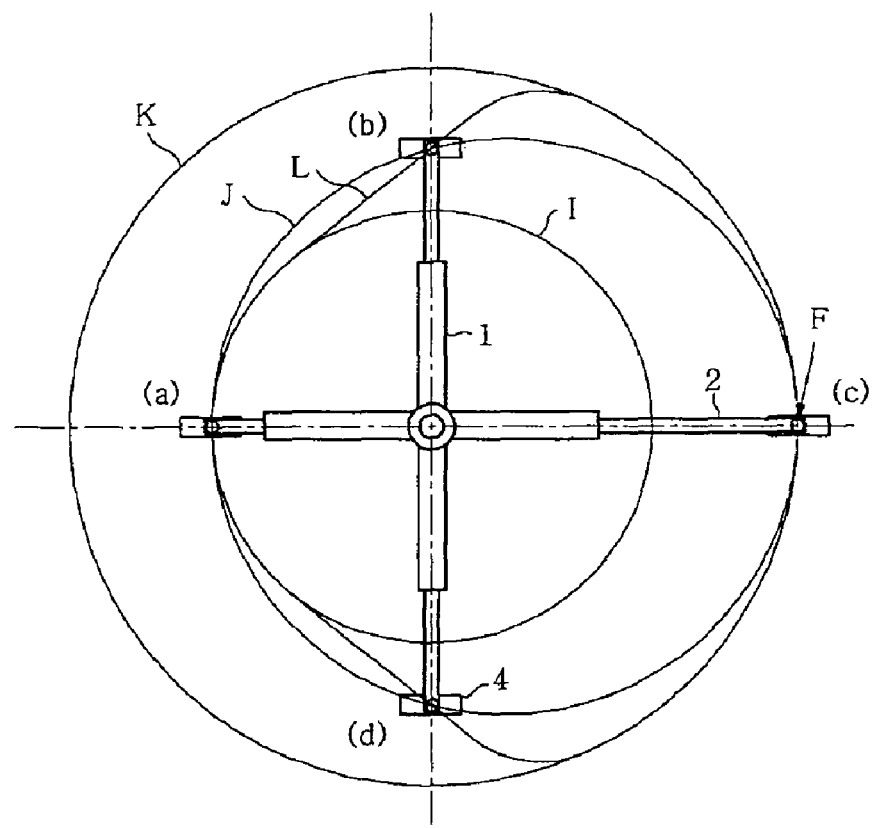

[Fig. 6]
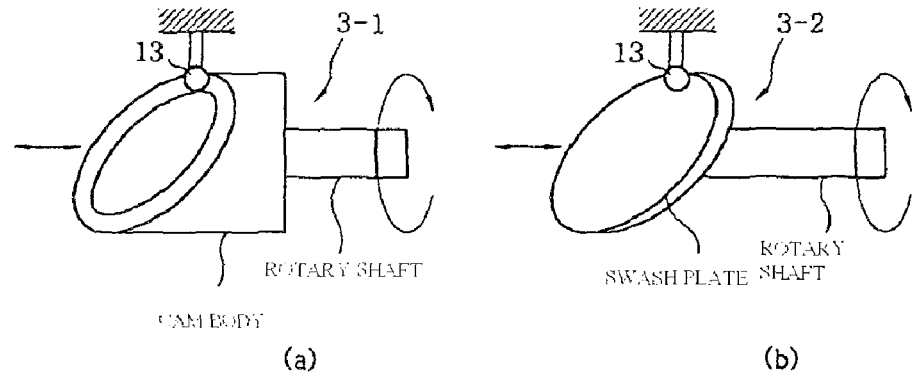
[Fig. 7]
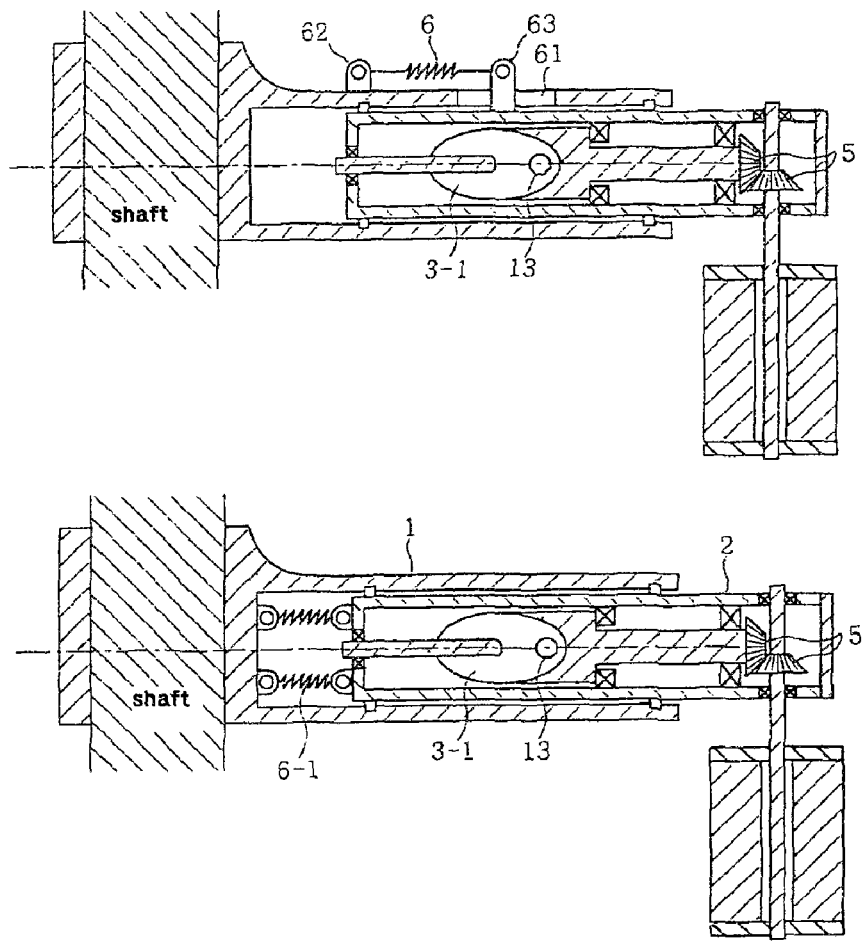

[Fig. 8]
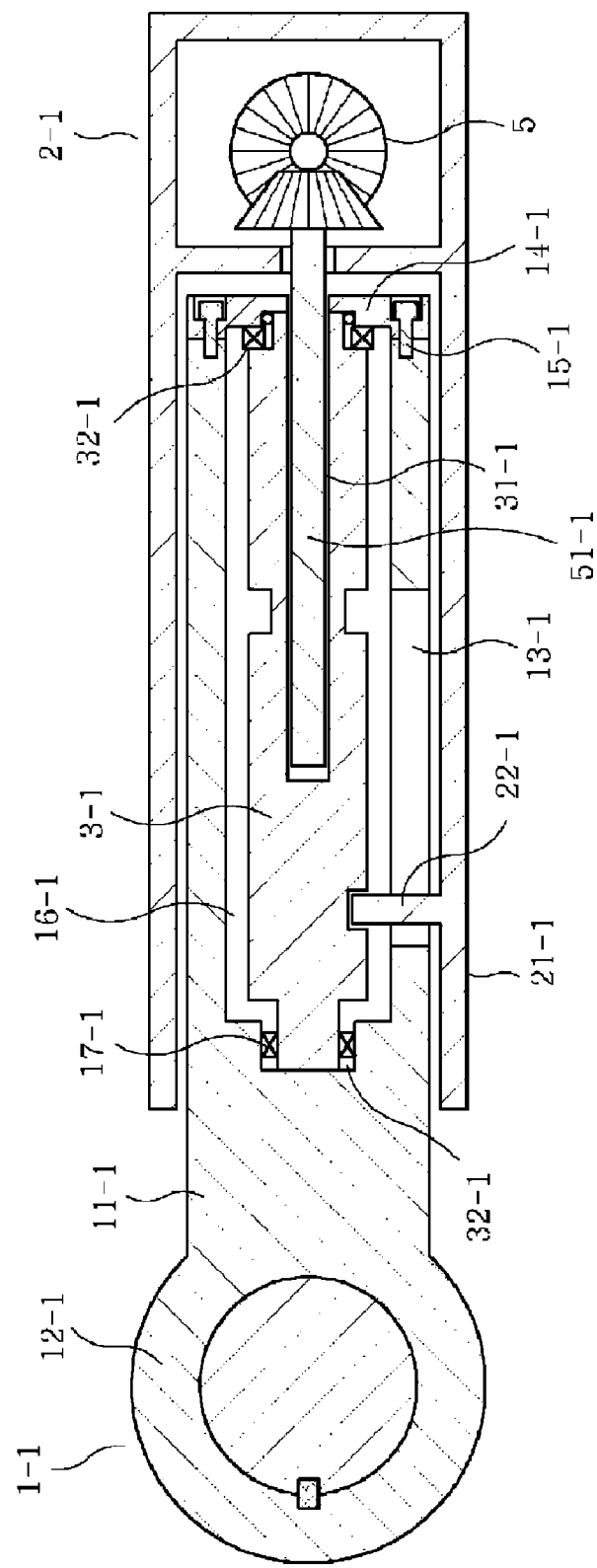

RETRACTABLE/EXTENDABLE CRANK USING A CYLINDRICAL CAM, AN END CAM, OR A SWASH PLATE CAM, AND BICYCLE USING THE SAME

RELATED APPLICATIONS

This application is a 371 application of International Application No. PCT/KR2009/003629, filed Jul. 2, 2009, which in turn claims priority from Korean Patent Application Nos. 10-2009-0056557, filed Jun. 24, 2009; 10-2008-0121047, filed Dec. 2, 2008; and 10-2008-0070058, filed Jul. 18, 2008, each of which is incorporated herein by reference in its entirety.

BACKGROUND OF THE INVENTION

1. Field of the Invention

The present invention relates to a mechanical element, in more detail, a crank connected to a pedal of a bicycle or a crank connected to a handle rotating rotary body, and a bicycle using the crank.

2. Description of the Related Art

One end of a crank rotating a rotary body is fixed to the shaft of a rotating body and the other end is connected to a member applying force to a handle and a pedal etc. Torque T rotating the rotary body is calculated by multiplying the length of the crank which corresponds to an arm length, that is, (by) the magnitude of force applied to the end of the crank. This is expressed by the following Formula.

$T = F \times L$, where $F$ is force and $L$ is arm length.

As can be seen from the Formula, it is possible to acquire larger torque from the same magnitude of force by increasing the length of the crank. When this is applied to a bicycle, since larger torque is achieved from the same force, it is possible to increase the speed of the bicycle and more easily climb a steep slope.

However, although it is possible to achieve larger torque by increasing the length of the crank, the rotational radius correspondingly increases and the arm or leg rotating the rotary body deviates from the normal motion range, which makes the rotation of the crank difficult and causes fatigue and discomfort.

The crank may be, for example, a bicycle crank connected with a pedal of a bicycle or a crank connected with a handle of a rotary body that is manually rotated. In the condition of use of the cranks, force is applied only in a predetermine rotation section in the entire rotation section where the crank rotates. For example, for the bicycle crank, torque is achieved by pressing the pedal with feet only while the pedal moves down from above in the entire rotation section.

In this case, large torque can be achieved if the length of the crank increases in the section where force is applied to rotate the rotary body, while the length of the crank decreases in the section where force is not applied, that is, in an idle section, such that if the rotational radius decreases, the arm or leg does not deviate from the normal motion range and the rotation may become easy.

An example of achieving larger torque by changing the length of the crank has been disclosed in Korean Patent Registration No. 10-0400648-0000 (Application No: 10-2001-0011635, Filing date: 2001 Mar. 7, Publication No. 10-2002-0071553, Publication Date: 2002 Sep. 13), titled "Device for Rotation of a Crank Type with a Variation Length", in order to achieve the technical object described above. The patent that has proposed a device for rotation of a crank type with a variation length not only is complicated, but has a large number of parts, such that the manufacturing cost increase and it may difficult to be mounted on the existing bicycles.

Further, the bicycles with a gearshift that are used to achieve larger torque uses several gears to more easily climb a hill, in which although the torque increases and it is possible to climb a hill with ease, it is required to reduce the speed by shifting in order to achieve large torque, such that the speed is necessarily reduced.

SUMMARY OF THE INVENTION

The present invention has been made in an effort to provide a crank rotating a rotary body that achieves large torque by increasing the length of the crank in a force-applying section, easily rotates in a section where force is not applied, by decreasing the length of the crank to reduce the rotational radius, and rotates with ease without making an arm or a leg not deviate from a normal rotation range such that it is not fatigued. The rotation becomes easy by increasing the length to achieve torque by pressing a crank pedal and decreasing the length when torque is not achieved and it idles, in order to use the retractable/extendable crank having the above function for a driving crank of a bicycle.

In order to achieve the goal of the present invention, the present invention uses a cylindrical cam 3. The cylindrical cam is rotatably disposed in a movable arm 2, a crank 1, 2 revolves about a rotary shaft when the crank rotate about the rotary shaft, a pedal 4 rotates in the opposite direction to the crank, an a pair of bevel gears 5 having a gear ratio of 1:1 is used to transmit torque due to the rotation of the pedal 4 to the cylindrical cam 3. A straight miter gear having a tooth ratio of 1:1 and an axial angle of 90° and a helical bevel gear are allowable for the bevel gears. In this case, as the crank 1, 2 rotates one turn, the pedal 2 rotates one turn and the cylindrical cam 3 rotates one turn. The crank extends when the pedal 4 is pressed to achieve torque, and the crank retracts when idling without achieving torque, such that as the crank 1, 2 rotates one turn, the movable arm 2 reciprocates one time longitudinally from the fixed arm 1.

In this configuration, it is preferable provide a lubricant or dispose a linear bearing at the rotating parts in order to reduce friction and make smooth sliding, by using bearings or bearing metal.

The retractable/extendable crank of the present invention can achieve large torque from the same force because the crank extends in a section where force is applied, and can smoothly rotate in a section where force is not applied, because the crank retracts and the rotational radius decreases. Further, an arm or a leg does not deviate from a normal motion range in use due to the decrease of rotational radius, such that the rotation is easily performed and the use is convenient.

The retractable/extendable crank of the present invention has very simple configuration and operation, such that it is suitable for a driving crank connected to the pedal of a bicycle. A bicycle equipped with the retractable/extendable crank can apply larger torque to a driving unit by using the same-sized driving crank as compared with common bicycles, such that it is possible to more rapidly climb a steeper hill using the same force.

Further, since the retractable/extendable crank of the present invention has a very simple configuration, such that the size and the weight can be reduced and the manufacturing cost is low. Therefore, it can be simply used for a pedal crank where a pedal of a bicycle is coupled or a rotating handle of a rotary body that is manually operated.

BRIEF DESCRIPTION OF THE DRAWINGS

FIG. 1 is a view showing the configuration of a retractable/extendable crank according to an exemplary embodiment of the present invention.

FIG. 2 is a view showing an example when the crank according to an exemplary embodiment of the present invention is used for driving a bicycle.

FIG. 3 is a cross-sectional view showing the configuration of a retractable/extendable crank using a cylindrical cam.

FIG. 4 is a view showing the configuration of a cylindrical cam.

FIG. 5 is a flowchart illustrating the operation of a retractable/extendable crank according to an exemplary embodiment of the present invention.

FIG. 6 is a view showing the configuration of an end cam or a swash plate cam.

FIG. 7 is a cross-sectional view showing the configuration of a retractable/extendable crank using an end cam.

FIG. 8 is a cross-sectional view showing the configuration of a retractable/extendable crank using a cylindrical cam according to another exemplary embodiment of the present invention.

DETAILED DESCRIPTION OF THE PREFERRED EMBODIMENTS

Embodiment 1

A retractable/extendable crank using a cylindrical cam, as shown in FIG. 1, includes a crank composed of a fixed arm 1 coupled to a rotary shaft of a rotary body, a crank having a movable arm 2 sliding in the fixed arm 1, a cylindrical cam 3 rotating in the movable arm 2, a pedal 4 connected to an exposed end of the movable arm 2, and a pair of bevel gears 5 fitted on the shaft of the cylindrical cam 3 and the shaft of the pedal 4.

An example when the retractable/extendable crank using a cylindrical cam having the above configuration according to an exemplary embodiment of the present invention is shown in FIG. 2.

The fixed arm 1, as shown in FIG. 3, has a fixed arm body 11 having one end with a boss 12 coupled to a rotary shaft and the other end that is bored to insert the movable arm 2 to retract/extend. A cam guide 13 protrudes inward on a side of the fixed arm body 11. The boss 12 of the fixed arm is coupled with the rotary shaft by a key 14 or a spline (not shown) to transmit torque to the rotary shaft. It is preferable that the cam guide 13 has a roller or is lubricated at the portion where it contacts with the a guide groove 32 or a guide protrusion 33 of the cylindrical cam 3, which is described below, in order to minimize friction with the guide groove or the guide protrusion.

The fixed arm 1 may be any circular pipe with a circular cross-section, but it requires a device, such as a key or a spline, which prevent axial rotation while allowing longitudinal retraction and extension, and it may be a pipe with a polygonal cross-section, but a quadrangular pipe with a quadrangular cross-section is preferable in consideration of manufacturing, supplying a material, and the cost. The quadrangular pipe is better because the movable arm 2 inserted in the fixed arm 1 does not rotate without using a specific anti-rotation device.

It is preferable that a rolling ball 15 or a linear bearing is disposed on the inner wall of the fixed arm 1 such that the movable arm 2 smoothly slides.

The movable arm 2 is inserted in the fixed arm 1 and longitudinally reciprocates, as shown in FIG. 3, and the cross-sectional shape of the movable arm 21 is a square, a polygon, or a circle in accordance with the cross-sectional shape of the fixed arm 1 and a slot 22 is formed at one side such that the cam guide 13 of the fixed arm 1 can reciprocate. Further, a cylindrical cam coupling hole 23 where the end of the cylindrical cam 3 (described below) is coupled is formed at one end of the movable arm body 21, a bearing 24 rotatably fixing for the cylindrical cam 3 is disposed therein, and a rotary shaft coupling hole 25 where the shaft of the rotary arm 4 is assembled is formed at the other end of the movable arm body 21.

Since the bearing 24 receives force in the axial direction as well as the lateral direction to the axis, and may be a combination of a radial bearing carrying lateral load and a thrust bearing carrying axial load or a composite bearing using a conical roller to carry both the axial load and lateral load. Further, a busing and washer type of bearing may replace the bearing.

The bearing can be directly disposed in the movable arm 2 when the fixed arm 1 and the movable arm 2 have circular cross-section; however, the bearing 24 may be fixed to a fixing plate 26 and then the fixing plate may be disposed in the movable arm, when the cross-sections are not circular.

The cylindrical cam 3, as shown in FIG. 4, has a spiral guide groove 32 (see (a) of FIG. 4) or a guide protrusion 33 (see (b) of FIG. 4) on the side of the cylinder 31, such that the cam guide 13 of the fixed arm 1 is engaged in the guide groove or the guide protrusion. A coupling protrusion 34 that is fitted in the cylindrical cam coupling hole 23 of the movable arm 2 is formed at the front of the cylindrical cam and a camshaft 35 where a bevel gear 5 described below is assembled is formed at the rear end.

The shape of the guide groove 32 or the guide protrusion 33 on the side of the cylinder 31 of the cylindrical cam 3 is determined similar to the shape design of common cams, and the inclination of the guide groove 32 or the guide protrusion 33 is determined in consideration of retraction and extension of the movable arm 2 according to the rotational angle of the cylindrical cam 3. When the present invention is used for a driving crank of a bicycle that is driven by the force of person's legs, the cylindrical cam 3 does not at relatively high speed, such that it is effective to design the guide groove such that the movable arm 2 keeps largely extending for a long time when the crank rotates and reaches the front semicircle, as indicated by an orbit L in (e) of FIG. 5, where a person presses the pedal in order to achieve large torque.

The pedal 4, as shown in FIG. 3, is formed by consists of a pedal plate 42 to a pedal shaft 41 and the pedal shaft 41 is assembled through the rear end of the movable arm 2. The pedal plate 42 is assembled by a key or a spline in order not to rotate with respect to the pedal shaft 41.

The pedal becomes a handle and the pedal shaft becomes a handle shaft when the present invention is applied to not a bicycle, but a manual rotary body, but they are referred to as a pedal and a pedal shaft for the convenience of description.

As shown in FIG. 3, one of the pair of bevel gears 5 is assembled to the camshaft 15 of the cylindrical cam 3 and the other is assembled to the pedal shaft 41 of the pedal 4. The pair of bevel gears has the same number of teeth and composed of two bevel gears with perpendicular axes. Therefore, as the pedal shaft 41 rotate one turn, the cylindrical cam 3 correspondingly rotate one turn.

Feasible bevel gears for the present invention may be various gear pairs with intersection axes, such as a straight bevel gear, a spiral bevel gear, and a zerol bevel gear, and a gear pair of non-parallel and non-intersecting axes, such as a crossed helical gear and a hypoid gear, and includes all gears having the same function, regardless of the names. In those gears, a pair of bevel gear having a tooth ratio of 1:1 and intersecting axes is called a miter gear, which is suitable for the present invention, because it is easily manufactured and supplied and the cost is low.

Though not described for each part, it is apparently preferable to minimizing friction at all the rotary parts by disposing a bearing or lubricating.

The operation of the retractable/extendable crank having the configuration described above is as follows.

As the pedal 4 and the pedal plate 42 are rotated by an arm or a leg, the entire crank revolves around the rotary shaft of the rotary body, in which the pedal plate 42 is held by an arm or a foot, without rotating, the crank composed of the fixed arm 1 and the movable arm 2 and the pedal 4 rotate one time about the pedal shaft 41, such that the pedal 4 and the crank 1, 2 relatively rotate one turn. With the rotation, the cylindrical cam 3 is rotated one turn by the pair of bevel gears 5, and as the cylindrical cam 3 rotates one turn, the guide groove 32 or the guide protrusion 33 moves along the cam guide 13 of the fixed arm 1, such that the cylindrical cam 3 and the movable arm 2 of which the motion in the camshaft is restricted by the cylindrical cam sequentially reciprocate one time, as shown in FIG. 5.

The crank has retracted as shown in (a) of FIG. 5, when the pedal 4 is positioned at the position 'a' in (e) of FIG. 5, which is a rear horizontal position, because force is not applied to the pedal, the crank gradually extends, as shown in (b) while the pedal passes the upper portion, which is the position 'b in (e), the crank maximally extends, as shown in (c) when the pedal has reached the position 'c' in (e) with the crank is horizontal forward and the largest force is applied to the pedal, and the crank gradually retracts, as shown in (d) while the pedal passes the lower portion, which is the position 'd', such that the crank returns to the position 'a' in (e), where it has the most retracted. With this operation repeated, the crank maximally extends when reaching the position where the largest force is applied to the pedal while the pedal rotates one time, thereby repeating retraction and extension.

When the retractable/extendable crank of the present invention is used, the locus of the pedal 4 is the curve indicated by 'J' in (e) of FIG. 5, in which the radius when force is applied I larger than the locus I of the crank when the crank has maximally retracted, such that large torque is applied, and the radius when force is not applied is smaller than the locus K of the crank when the crank has maximally extended, such that the rotational radius reduces.

Embodiment 2

The retractable/extendable crank described above may be implemented by an end cam 3-1 or a swash plate cam 3-2, instead of the cylindrical cam 3. A close-contact spring 6 is necessary to keep the cam surface and a cam guide 13 in close contact, in order to use the end cam or the swash plate cam.

The end cam 3-1 has the shape shown in (a) of FIG. 6 and is a cam that is manufactured by coupling a rotary shaft to a cam body formed by cutting off at an angle one end of a pipe or a cylinder having a definite thickness, and a cam guide 13 is in close contact to the slope. As the end cam 3-1 rotates around the camshaft, the end cam 3-1 is reciprocated by the cam guide 13 fixed to a fixed arm and accordingly a movable arm 2 in the end cam 3-1 retracts/extends while slide-reciprocating.

The swash plate cam 3-2 has the shape shown in (b) of FIG. 6 and is a cam that is manufactured by coupling a circular swash plate to a rotary shaft at an angle, in which a cam guide 13 is in close contact to the surface of the circular swash plate. The operational mechanism of the swash plate cam 3-2 is the same as that of the end cam 3-1.

An exemplary embodiment when the end cam 3-1 is applied to the retractable/extendable crank of the present invention is shown in FIG. 7, in which the end cam 3-1 is deposed in the movable arm 2, instead of the cylindrical cam 3, and a close-contact spring 6 is disposed to keep the end cam in contact with the cam guide 13. The close-contact spring may be disposed outside the crank, as shown in (a) of FIG. 7, or may be disposed inside the crank, as shown in (b) of FIG. 7.

When the close-contact spring 6 is disposed outside the crank, a spring bracket slit 61 and a spring bracket 62 is formed at one side of the fixed arm 1 where the cam guide 13 is not attached, and a spring bracket 63 is formed in the movable arm 2 such that the spring bracket 63 of the movable arm 2 can reciprocate in the spring bracket slit 61. Further, both ends of the close-contact spring 6 are fixed to the spring brackets 62 and 63, respectively.

As shown in (a) of FIG. 7, when the close-contact spring 6 is an tension coil spring, the close-contact spring pulls the movable arm 2 toward the fixed arm 1, such that the slope of the end cam 3-1 in the movable arm 2 is kept in close contact to the cam guide 13 attached to the fixed arm 1. As the end cam 3-1 rotates and the movable arm 2 extends, the close-contact spring extends, and as the end cam 3-1 keeps rotating and the movable arm 2 retracts, the movable arm 2 is slid into the fixed arm 1 by the restoring force of the close-contact arm 6. The same operational effect can be achieved, when the close-contact spring 6 is a compression coil spring and the fixed arm 1 pushes the movable arm 2 such that the slope of the end cam 3-1 is kept in close contact with the cam guide 13.

When disposing the close-contact spring 6 in the crank, as shown in (b) of FIG. 7, it is possible to dispose one or more extension springs, that is, close-contact springs 6-1, between the fixed arm 1 and the movable arm 2 inside the fixed arm 1 such that the movable arm 2 is pulled toward the fixed arm 1 and the slope of the end cam 3-1 in the movable arm 2 is kept in close contact to the cam guide 13 attached to the fixed arm 1.

This exemplifies when the end cam 3-1 replaces the cylindrical cam 3, but the same effect can be achieved even using the swash plate cam 3-2, instead of the end cam 3-1.

Embodiment 3

According to another exemplary embodiment of the present invention, a crank uses a cylindrical cam, similar to the Embodiment 1, in which the cylindrical cam is disposed not in the movable arm, but in the fixed arm.

The retractable/extendable crank using a cylindrical cam according to this exemplary embodiment, as shown in FIG. 7, includes a crank composed of a fixed arm 1-1 coupled to a rotary shaft of a rotary body and a movable arm 2-1 sliding outside the fixed arm 1-1, a cylindrical cam 3-1 rotating in the fixed arm 1-1, a pedal (not shown) coupled to the end of the movable arm 2-1, and a pair of bevel gears 5 assembled on the shaft of the cylindrical cam 3-1 and the shaft of the pedal, respectively.

In the fixed arm 1-1, similar to that of the Embodiment 1, a boss 12-1 fitted on a rotary shaft is formed at one end of a fixed arm body 11-1 and the other end of the fixed arm body 11-1 is inserted in the movable arm 2-1, a cylindrical cam hole 16-1 is formed therein to mount the cylindrical cam 3-1, and a cylindrical cam coupling hole 17-1 where the end of the cylindrical cam 3-1 is fitted is formed on the bottom of the cylindrical cam hole 16-1. Further, a slot 13-1 is formed at one side of the fixed arm body 11-1 such that a cam guide 22-1 of the movable arm 2-1 can reciprocate and it is preferable that a cover plate 14-1 is fastened by bolts 15-1 to cover the inlet of the hole after coupling the cylindrical cam 3-1.

The movable arm 2-1 covers the fixed arm 1-1 to reciprocate relative to the fixed arm, and the cam guide 22-1 that is fitted in a guide groove 32 of the cylindrical cam 3-1 across the slot 13-1 of the fixed arm 1-1 protrudes inward at one side of a movable arm body 21-1.

The cylindrical cam 3-1 has the same shape as that of the Embodiment 1, but has a spline hole 31-1 at the center where a spline shaft of the bevel gear is fitted. Further, it is preferable that bearings 32-1, which are a journal bearing and a thrust bearing, are disposed ahead of and behind the cylindrical cam to make rotation smooth. The cam guide 22-1 of the movable arm 2-1 is engaged with the guide groove or the guide protrusion of the cylindrical cam 3-1.

A pedal shaft is coupled to the shaft of one of the pair of bevel gears 5 and a spline shaft 51-1 fitted in the spline hole 31-1 of the cylindrical cam 3-1 is coupled to the other bevel gear.

The operation of the crank according to this exemplary embodiment is the same as that of the Embodiment 1. However, the cam guide 22-1 of the movable arm 2-1 reciprocates the movable arm 2-1 relative to the fixed arm 1-1 while moving along the guide groove 32 of the cylindrical cam 3-1 fixed and rotating in the fixed arm 1-1, thereby retracting/extending the crank.

A bicycle equipped with the retractable/extendable crank of the present invention, instead of the pedal link, can be achieved, from a common bicycle equipped with front and rear wheels, a frame with a saddle, a handle adjusting the running direction of the bicycle by changing the direction of the front wheel, a pedal crank where the pedal of the bicycle is coupled, and a power transmission transmitting torque from the pedal link to the rear wheel.

In a bicycle equipped with the retractable/extendable crank of the present invention, since force can be applied to the pedal, with the crank maximally extending, large torque can be achieved. Further, the rotational radius reduces, as in the locus J or the locus L when force is not applied, as compared with the locus K of the crank that has maximally extended, such that rotation becomes easy.

The present invention can be used as a mechanical element, such as a pedal link where the pedal of a bicycle is coupled or a rotational handle crank of a rotary body that is manually operated.

What is claimed is:

1. A retractable/extendable crank comprising:
   a fixed arm having an end coupled to a rotary shaft of a rotary body to transmit torque and a cam guide on a side wall of the fixed arm engaged with a guide groove or a guide protrusion of a cylindrical cam;
   a movable arm retracting and extending while longitudinally sliding in the fixed arm;
   the cylindrical cam disposed in the movable arm in an axial direction of the movable arm and having the guide groove or the guide protrusion engaging with the cam guide of the fixed arm;
   a pedal composed of a pedal shaft coupled to an exposed end of the movable arm and a pedal plate coupled to the pedal shaft, the pedal plate not rotating with the pedal shaft; and
   a pair of bevel gears coupled to a camshaft of the cylindrical cam and the pedal shaft of the pedal, respectively, and having a tooth ratio of 1:1.

2. The retractable/extendable crank according to claim 1, wherein the rotary shaft of the rotary body is a driving shaft equipped with a driving sprocket and used for driving a bicycle, by using the cylindrical cam.

3. A bicycle configured to be equipped with at least a pedal crank where a pedal of the bicycle is coupled, wherein the pedal crank is the retractable/extendable crank according to claim 1.

4. A retractable/extendable crank comprising:
   a fixed arm having an end coupled to a rotary shaft of a rotary body to transmit torque and a cam guide being in close contact with a slope of an end cam or a swash plate cam;
   a movable arm retracting and extending while longitudinally sliding in the fixed arm;
   the end cam or the swash plate cam disposed in the movable arm in an axial direction of the movable arm and having a rotary shaft and a cam body formed by cutting off at an angle an end of a pipe or a cylinder having a predetermined thickness;
   a close-contact spring having one end connected to the fixed arm and the other end fixed to the movable arm to keep the slope of the end cam or the swash plate cam and the cam guide of the fixed arm in close contact;
   a pedal composed of a pedal shaft coupled to an exposed end of the movable arm and a pedal plate coupled to the pedal shaft, the pedal plate not rotating with the pedal shaft; and
   a pair of bevel gears coupled to a camshaft of the end cam or swash plate cam and the pedal shaft of the pedal, respectively, and having a tooth ratio of 1:1.

5. The retractable/extendable crank according to claim 4, wherein the rotary shaft of the rotary body is a driving shaft equipped with a driving sprocket and used for driving a bicycle, by using the cylindrical cam.

6. A bicycle configured to be equipped with at least a pedal crank where a pedal of the bicycle is coupled, wherein the pedal crank is the retractable/extendable crank according to claim 4.

7. A retractable/extendable crank comprising:
   a fixed arm having an end coupled to a rotary shaft of a rotary body to transmit torque,
   a boss coupled to the rotary shaft at the end of the fixed arm, a cylindrical cam hole therein to mount a cylindrical cam, and a slot on one side of the fixed arm to allow a cam guide of a movable arm to reciprocate;
   the movable arm retracting and extending while longitudinally sliding outside the fixed arm and having the cam guide protruding inward and engaged with a guide groove or a guide protrusion of the cylindrical cam across the slot of the fixed arm;
   the cylindrical cam disposed in the fixed arm in an axial direction of the fixed arm, having the guide groove or the guide protrusion engaged with the cam guide of the movable arm, and having a spline hole where a spline shaft of a bevel gear is fitted;
   a pedal composed of a pedal shaft coupled to an exposed end of the movable arm and a pedal plate coupled to the pedal shaft, the pedal plate not rotating with the pedal shaft; and
   a pair of bevel gears, one of which is fitted on the pedal shaft of the pedal and the other has a spline shaft fitted in the spline hole of the cylindrical cam to be coupled with the cylindrical cam, and which has a tooth ratio of 1:1.

8. A bicycle configured to be equipped with at least a pedal crank where a pedal of the bicycle is coupled, wherein the pedal crank is the retractable/extendable crank according to claim 7.

* * * * *